March 9, 1926.
J. A. McCASKELL
1,575,777
SHOCK ABSORBER
Filed Nov. 16, 1922    3 Sheets-Sheet 2
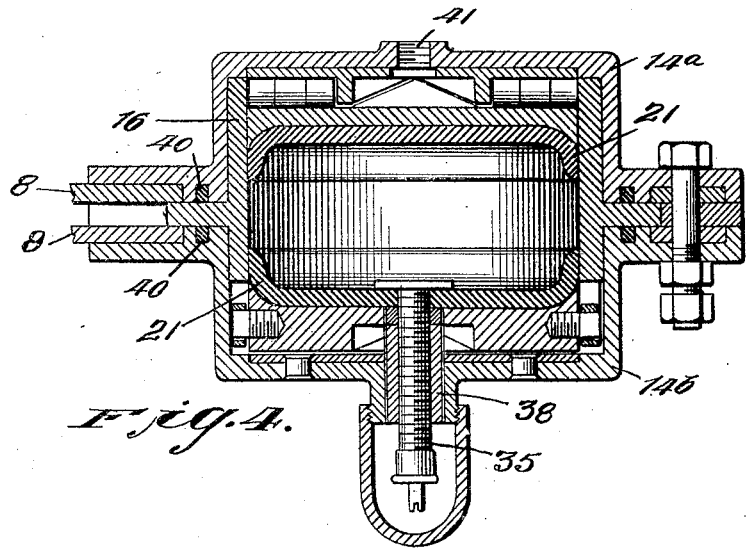
Fig. 4.
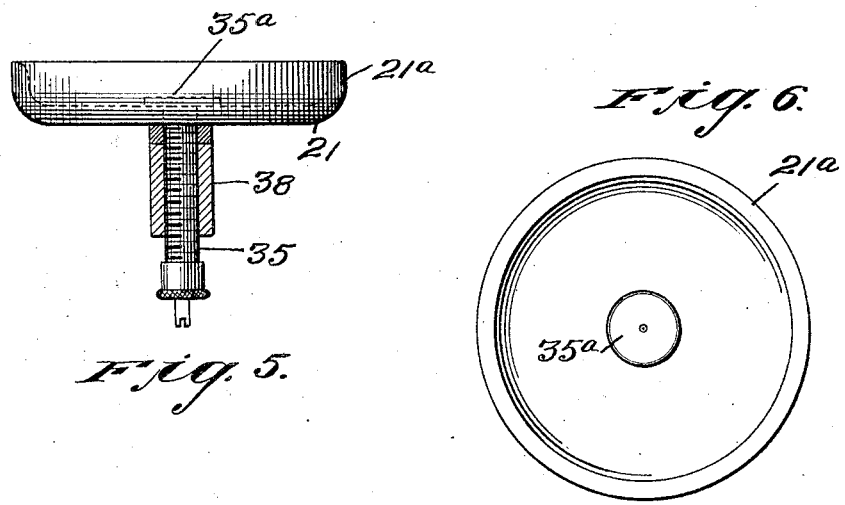
Fig. 5.
Fig. 6.
Jasper A. McCaskell
INVENTOR
BY Moses, Hammond Morse & Holt
ATTORNEYS March 9, 1926.

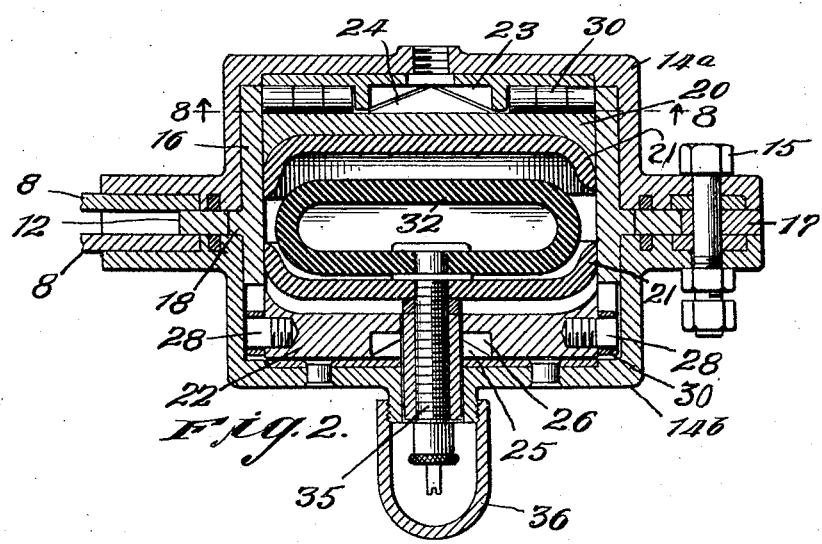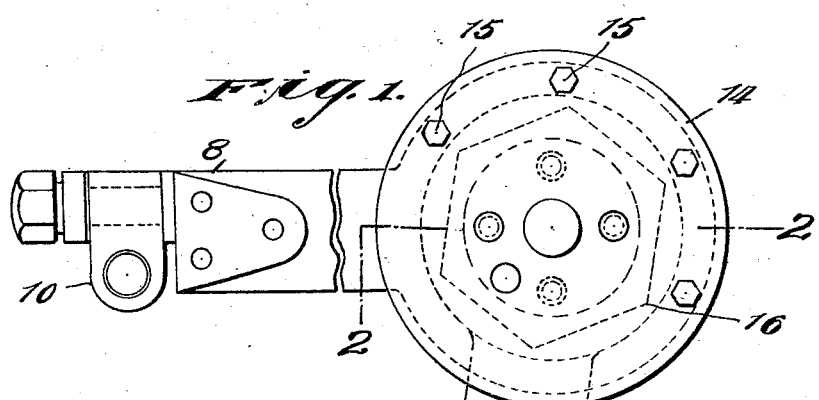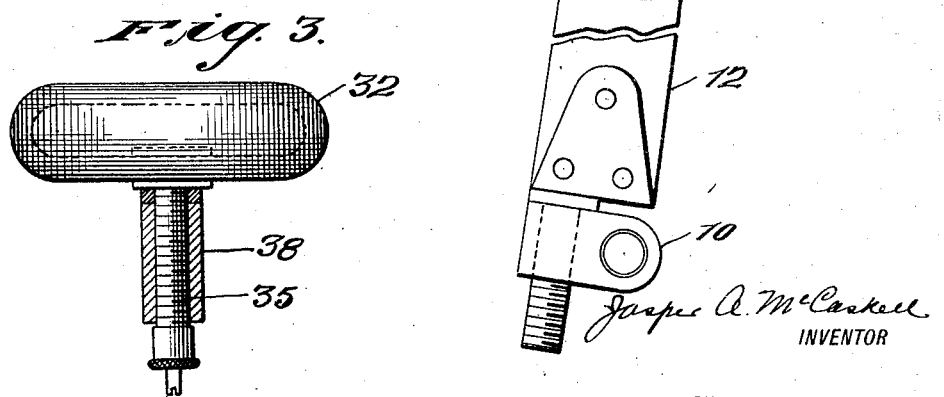

J. A. McCASKELL 1,575,777

SHOCK ABSORBER

Filed Nov. 16, 1922      3 Sheets-Sheet 3

Jasper A. McCaskell
INVENTOR

BY
Moore, Hammond & Nolte
ATTORNEYS

Patented Mar. 9, 1926.

1,575,777

UNITED STATES PATENT OFFICE.

JASPER A. McCASKELL, OF SALT LAKE CITY, UTAH.

SHOCK ABSORBER.

Application filed November 16, 1922. Serial No. 601,229.

*To all whom it may concern:*

Be it known that I, JASPER A. McCASKELL, a citizen of the United States, residing in Salt Lake City, county of Salt Lake, and State of Utah, have invented certain new and useful Improvements in Shock Absorbers, of which the following is a specification.

This invention relates to shock absorbers and more especially to a device for absorbing the shocks due to the rebound of vehicle supporting springs.

It is an object of this invention to provide a device which will eliminate the use of springs or friction devices, which will have a cumulative retarding effect that will offer increased resistance with increasing magnitude of movement.

It is the further object of this invention to provide a shock absorber which will employ that most resilient of shock absorbing mediums "air," and which will so employ air that the device will be most compact and adapted for ready attachment to the vehicle, without change in the vehicle parts, and without affecting the appearance of the vehicle or lessening its beauty but will rather appear to be, exactly what it becomes, a co-operative part of the complete vehicle.

It is still another object of this invention to so contain the air which is employed that it may be renewed in case of leakage, or its pressure changed to obtain varying effects.

More specifically this present invention forms improvement upon, and advances in, that particular type of shock absorber protected under prior applications for which Patents No. 1,301,067 and 1,332,506 of April 15, 1919, and March 2, 1920, respectively, have been granted to the applicant.

Like numerals indicate like parts throughout the several views of the accompanying drawings, in which:

Figure 1 is an elevation of one embodiment of my invention;

Figure 2 is a sectional view on the line 2—2 in Figure 1;

Figure 3 is an elevation of a detail of Figure 2;

Figure 4 is a sectional view on the line 2—2 of Figure 1, indicating a modified internal construction over that shown in Figure 2.

Figure 5 is an elevation, in partial section, of a detail of Figure 4.

Figure 6 is a plan view of a detail of Figure 4.

Figure 7:
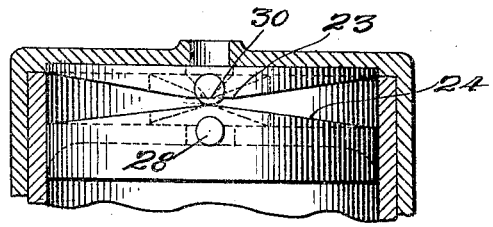
Fig. 7 is a part sectional view of the cams with their highest points in contact.
Figure 8:
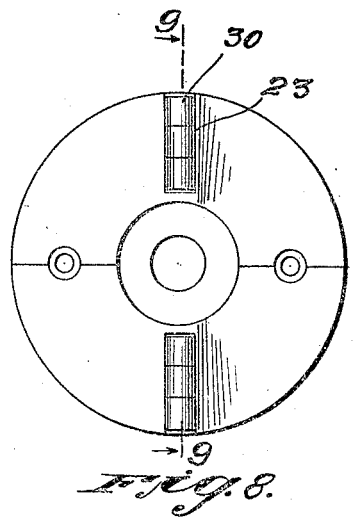
Fig. 8 is a view of the face of the stationary cam on the line 8—8 of Fig. 2.
Figure 10:
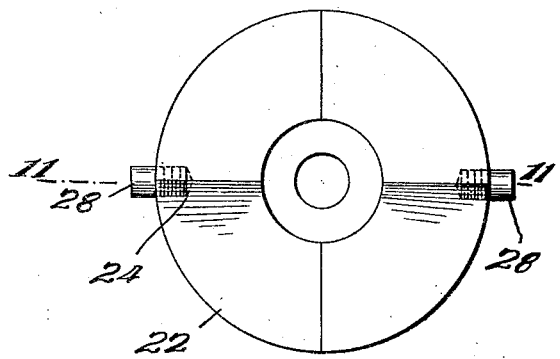
Fig. 10 is a plan view of the movable cam.
Figure 9:
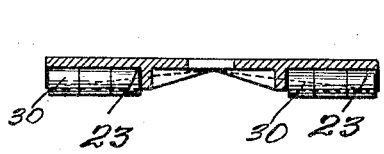
Fig. 9 is a sectional view on the line 9—9 of Fig. 8.
Figure 11:
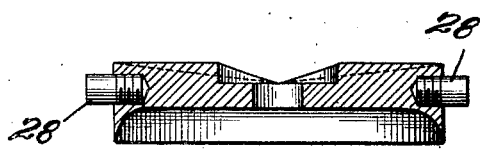
Fig. 11 is a sectional view of the movable cam on the line 11—11 of Fig. 10.

Referring to Figure 1, two arms 8 and 12 are attachable to the vehicle chassis and to the running gear, respectively. Arm 8 is secured to and forms a projecting part of casing 14 while arm 12 enters the casing 14, thru a slot between its two halves, to engage an internal cylinder 16 (shown by dotted lines in Figure 1). For convenience in attaching arms 8 and 12 to the vehicle parts such means as lugs 10 are provided at the outer extremities of these arms.

Referring now to Figure 2. The casing 14 will be seen to consist of two halves 14ª and 14ᵇ which are secured together, and to the arm 8, which is also constructed in two halves, by the bolts 15 and the spacer ring 17.

The cylinder 16 is provided with flange 18 which serves as a bearing for the rotation of this cylinder in the casing 14, and also as a rigid connection between arm 12 and cylinder 16 by such means as the hexagonal joint indicated by the dotted lines in Figure 1. Cylinder 16 has two pistons 20 and 22 adapted to move toward each other under the action of the casing cams 23 and 25 bearing upon cams 24 and 26.

Cams 23 and 25 are rigid with the casing 14, while cams 24 and 26 are formed upon the pistons 20 and 22 which are prevented from turning independently of cylinder 16 by such means as the pins 28 which engage slots in the walls of cylinder 16, to prevent turning but not preventing lateral movement of the pistons in cylinder 16. Movement of arms 8 and 12 will rotate casing 14, and cylinder 16, with respect to each other, which will cause the cams to slide over one another and force the pistons 20 and 22 inward. To reduce friction between the various parts roller bearings are inserted in the stationary cam 23 as at 30 so as to provide a rolling contact between the cam faces 23 and 24 or 25 and 26.

Fig. 7 is an exaggerated view of the roller 30, projecting above the surface of cam 23, and of the cams 23 and 24, each at their highest point. In actual operation, the shock absorber is adjusted so that the extreme position of Fig. 7 is never reached.

Pistons 20 and 22 are provided with leather packing cups 21 which protect the rubber air drum 32 from any cutting or pinching by the movable pistons, and eliminate any possibility of oil, grease or dirt coming in contact with the rubber. These leather packing cups 21 have lip portions 21ª adapted to be forced outward by internal pressure and tend to form an air seal preventing the leakage of air from the rubber drum during the operation of the shock absorber, and serve to maintain a sort of intermediary pressure chamber which substantially reduces the strain upon air drum 32. Air drum 32 is provided with a valved connection 35, similar to the air valve ordinarily used on automobile tires, through which air may be introduced at any desired pressure. This connection 35 is provided with a protecting cap 36 which attaches directly to the casing 14.

It has been found that in some cases the use of the rubber drum 32 may be entirely dispensed with, if this is done the air pressure is maintained directly in the cylinder 16 by the cup leather packings 21 and 21ª shown in Figure 4. The valved connection 35 is now made directly through the lower cup leather 21 and air is supplied to the desired pressure as was done when employing the rubber bag described in the first modification. It has been found advantageous to surround the connection 35 with a sleeve 38 to form a sliding fit in casing 14, this sleeve 38 screws over connection 35 and serves as a means of clamping lower cup leather 21 tight against the enlarged end 35ª of the connection 35 after the method commonly employed for securing tire valves to rubber tires.

To provide for lubrication of the cams and of the cylinder surfaces which slide in the casing, fibre rings 40 and an oiling connection 41 are disclosed.

It will be seen that my new construction provides effectual protection for the rubber drum from abrasion, from oil and from dirt, and serves to afford a partial balancing of pressure between the outside and inside of the rubber drum for the reduction of disruptive pressure differences. In the modification last described the total elimination of the rubber drum is provided for and means substituted therefor, which are at once simple and of such nature as to increase in air retaining ability as the air pressure rises.

It is believed that the operation of the invention will be fairly clear from the foregoing description but to assure that such is the case, a short description of the operation of the particular embodiments shown in the drawings, is appended.

It is well known, to the automobile art particularly, that the vehicle supported by springs encountering a sharp irregularity in the road surface, is often set in violent and most unpleasant oscillation, due to the undamped action of the vehicle springs. This invention provides for the damping of these oscillations, for aiding the vehicle springs at the moment of greatest strain, and adds greatly to the easy riding qualities of the vehicle.

The applicant's device is attached across the spring suspension, as previously described, so that the compression and rebound of the vehicle spring is opposed by absorber action, the magnitude of which is directly dependent on the extent of the spring action. This is accomplished by the internal arrangement of parts which is disclosed in Figure 2. The arm 8 is secured to the vehicle chassis, while the arm 12 is secured to the lower part of the spring, or to the axle. Arm 8 is secured to the casing 14 which carries the cams 23 and 25. Arm 12 is secured to the cylinder 16 which is provided with the pistons 20 and 22 having cams 24 and 26 mounted upon their outer surfaces. Pistons 20 and 22 slide within cylinder 16 but rotate with this cylinder, and with the action of arm 8.

The motions of the vehicle spring are thus transformed through the arms 8 and 12 to rotative movement between the casing 14 and cylinder 16. This causes cams 24 and 26 to move over cams 23 and 25 from the normal rest positions shown in Figure 2, the cam shape forces the pistons 20 and 22 toward each other, this movement compresses the air between the cup leathers 21 and also that in the drum 32 if such drum is provided. As the pistons 20 and 22 are forced nearer together the pressure of the air rises and increases the resistance to the movement of the arms 8 and 12. In this way a cumulative effect, varying exactly with the extent of spring movement from normal, is obtained. The cams 23, 24, 25, and 26 are sloped in two directions so that movement in either a direction from normal, or rest position, provides a corresponding action to that described above. It will be seen that the elements used are simple, compact and rugged, that the rubber air drum, if used, is so enclosed and protected that deterioration will be at a minimum and it will be reinforced by the cylinder walls and by the leather cups 21, while these leather cups are themselves reinforced and supported by the shaped pistons 20, 22, and by the walls of cylinder 16.

The whole device is small and may be located in any desirable location without interfering with access to or with the operation of, other vehicle parts.

It will be evident that many modifications may be made in the construction, and in the application, of my device without departing from the scope of the invention or the spirit of the following claims.

What I claim is:

1. A shock absorber comprising a tubular chamber, a piston in each end of said chamber, an air drum between said pistons, packing means between each piston and the air drum, and means to move the pistons toward or away from each other when the relative position of the vehicle and the running gear is changed.

2. A shock absorber comprising a cylindrical chamber, a piston in each end of said chamber, a rubber air drum between said pistons, leather protecting cups between each piston and the air drum, and means to move the pistons toward or away from each other when the relative position of the vehicle and the running gear is changed.

3. A shock absorber comprising a cylindrical chamber, a piston in each end of said chamber, an air drum between said pistons, leather protecting cups between each piston and the air drum, and cam means to move the pistons toward or away from each other when the relative position of the vehicle and the running gear is changed.

4. A shock absorber comprising a casing, a cylindrical chamber rotatably mounted within said casing, a piston in each end of said cylindrical chamber, an air drum between said pistons, protecting cups between each piston and said air drum, and means to move said pistons toward or away from each other when said inner chamber and said casing are rotated with respect to each other.

5. A shock absorber comprising a casing, a cylindrical chamber rotatably mounted therein, a piston in each end of said cylindrical chamber, an air drum between said pistons, leather protecting cups between each piston and said air drum, and cam means attached to said cylindical chamber and said casing to cause said pistons to move toward or away from each other when the said chamber and the said casing are rotated with respect to each other.

6. A shock absorber comprising a casing, a cylindrical chamber rotatably mounted therein, a piston in each end of said chamber, an air drum between said pistons, leather packing cups between each piston and said air drum, means to move said pistons toward or away from each other when said casing and said chamber are rotated with respect to each other, and means to cause said casing and said chamber to rotate when the relative position of the vehicle and running gear is changed.

7. A shock absorber comprising a tubular chamber, a piston at each end of said chamber, an air drum between said pistons, leather protecting cups between said air drum and each piston, means to move said pistons toward or away from each other when the relative position of the vehicle and running gear is changed, and means for introducing air under pressure into said air drum.

8. A shock absorber comprising a casing, a cylindrical chamber rotatably mounted within said casing, cap members secured to the ends of the casing, rollers mounted on the inner side of said cap members, a piston at each end of said cylindrical chamber, said pistons having cam faces adapted to engage with the rollers on said caps to move said pistons toward or away from each other, an air drum between said pistons, and leather protecting cups between each piston and said air drum.

In testimony whereof I have affixed my signature to this specification.

JASPER A. McCASKELL.